(12) United States Patent
Koelman

(10) Patent No.: US 6,731,280 B1
(45) Date of Patent: May 4, 2004

(54) METHOD AND DEVICE FOR DESIGNING SURFACES WITH A FREE FORM

(75) Inventor: Herbert Jan Koelman, Bussum (NL)

(73) Assignee: Koelman Intellectueel Eigendom B.V., Bussum (NL)

( * ) Notice: Subject to any disclaimer, the term of this patent is extended or adjusted under 35 U.S.C. 154(b) by 0 days.

(21) Appl. No.: 09/432,129

(22) Filed: Nov. 2, 1999

(30) Foreign Application Priority Data

Nov. 2, 1998 (NL) .............................................. 1010452

(51) Int. Cl.[7] .............................................. G06T 15/00
(52) U.S. Cl. ...................................................... 345/420
(58) Field of Search ................................. 345/419, 420, 345/441, 442, 443

(56) References Cited

U.S. PATENT DOCUMENTS

| | | | |
|---|---|---|---|
| 5,459,821 A | 10/1995 | Kuriyama et al. | |
| 5,586,230 A | 12/1996 | Leon et al. | |
| 5,615,317 A | * 3/1997 | Freitag | ......................... 345/419 |
| 5,627,949 A | * 5/1997 | Letcher, Jr. | .................. 345/420 |
| 5,734,383 A | 3/1998 | Akimichi | |
| 6,133,922 A | * 10/2000 | Opitz | .......................... 345/420 |

OTHER PUBLICATIONS

A.K. Chaturvedi et al., "Procedural method for terrain surface interpolation", pp. 542–566, Computers and Graphics, vol. 20, No. 4, Jul. 1, 1996.

* cited by examiner

Primary Examiner—Almis R. Jankus
(74) Attorney, Agent, or Firm—Young & Thompson

(57) ABSTRACT

Method and device for designing a three-dimensional surface (10), comprising the following steps: a) defining an initial surface by forming a topological model of the three-dimensional surface, represented by means of half-edge boundary modelling of boundary elements (facet (13), closed loop (16), edge (22), half-edge (19) and vertex (25)), b) presenting the three-dimensional surface (10) to the user and c) modifying the three-dimensional surface (10), wherein in step a) the representation of the topological model further comprises the data structures line (28), which describes a sequence of edges (22), curve (35) and plane (30), which form the geometrical description of an edge (22), or, respectively, a facet (13).

11 Claims, 2 Drawing Sheets

METHOD AND DEVICE FOR DESIGNING SURFACES WITH A FREE FORM

BACKGROUND OF THE INVENTION

The present invention relates to a method and device for designing surfaces with a free form, in particular, three-dimensional surfaces, comprising the following steps: a) defining an initial surface by forming a topological model of the three-dimensional surface, the topological model being represented by means of half-edge boundary modelling of boundary elements, comprising the data structures facet, closed loop, edge, half-edge and vertex; b) presenting the three-dimensional surface to the user with the aid of at least, one two-dimensional image; and c) modifying the three-dimensional surface.

The invention can be used in particular in designing ships. When designing a ship the shape of the hull is particularly important, both for streamlining and for the attractiveness of the design. Modification of the hull for streamlining and attractiveness is also referred to in shipbuilding by the term fairing. The more general term streamlining will be used below, it being assumed that this term also covers making the design attractive.

In known techniques for designing ships use is made of a representation of the surface of a ship model with the aid of wire models ('simple wire-frame'). These can be presented to the designer using techniques known per se and hydrostatic calculations can also be performed using these models. It is also possible to perform calculations with regard to stability, movement of and loading of sections in waves. A disadvantage of this design technique is that there is no description of the surfaces between the lines of the simple wire-frame. An attempt is made to overcome this disadvantage by defining surface patches between lines of the simple wire-frame in order to obtain a complete surface of the design. However, this method is highly complex and user-intensive because it is necessary to work with surface patches in small areas and, at the same time, account must be taken of the shape of the complete surface.

Another possibility for designing a surface with a free form, which is also used in designing ships' hulls, is to define a surface model. Actually the abovementioned filling of a simple wire-frame with surface patches is a first example of this here. More advanced techniques define surface models with the aid of basis splines, mathematical expressions of a three-dimensional line or three-dimensional surface. A special class of basis splines, the non-uniform parameterised rational basis splines, NURBS, are particularly suitable for this purpose because these are able to represent arbitrary curved lines, straight lines, circles, parabolae, ellipses and hyperbolae with the aid of a single standardised equation.

It is also possible to use a two-dimensional NURBS to describe a three-dimensional surface. By making use of only a single NURBS having a restricted dimension $G^X$ (by restricting X to 2 the surface will have a global continuity in contact planes/lines and curvature) this will result in a streamlined surface. This technique works well for simple hull designs, such as those for yachts, but still requires an appreciable number of manual operations by the naval architect to describe the complex shapes at the bow and stern of merchant ships. It is very difficult to define discontinuities, such as in the keel, with the aid of a single NURBS because there is a tendency to round off sharp transitions in surfaces.

It is also possible to make use of various smaller NURBS surface patches, which demands less effort for designing but often gives rise to problems with regard to the streamlining at the transitions between the various surface patches.

A number of disadvantages are associated with the use of basis splines and/or NURBS. The equations for basis splines and NURBS imply a network that is rectangular in the parameter space. The lines defined are in general not parallel to the orthogonal planes which are used, inter alia, for ships. Consequently it is possible to display the three-dimensional shape in the conventional manner (for ships: with the aid of waterlines, verticals and ribs) only with the aid of complex calculations and display techniques. Furthermore, with a regular network it is not possible to define partial network lines, which, for example, are needed for partial waterlines, additional local shape information and integrated roundings of the prow. By using complete network lines for these details good definition of said details is obtained, but the network lines can give rise to deformations in other locations on the surface. Finally, the location and nature of the network lines are already defined early in the design phase and subsequent modifications thereof are difficult to implement. Frequently it is quicker and easier to start again in such a case.

A further method for designing surfaces with a free form, which is also used in designing ships' hulls, is the use of N-sided surface patches based on a description of the hull surface by a simple wire-frame. An N-sided surface patch is inserted in each of the topological holes in the simple wire-frame using the boundary curves and derivatives over the boundaries to describe the shape of the patch. The number of sides N of the surface patches is usually 3 to 6. This method has the advantage that there is a one-to-one relationship between the simple wire-frame and the surface model. A disadvantage is that the use of NURBS has become a 'de facto' standard in many design software packages. Designs defined with the aid of N-sided surface patches can thus not easily be exchanged with other software. A further disadvantage is that it is necessary to work with a simple wire-frame and a multiplicity of N-sided surface patches from the start of the design of the surface.

One example of this method using N-sided surface patches is disclosed in U.S. Pat. No. 5,459,821 in the name of Shigeru Kuriyama et al. Said patent describes a method for generating a polygonal surface patch in which the form in which each boundary curve is expressed and the topology of the curve network can be freely adjusted. With this method the boundary curves must be two-dimensional and surface patches are generated by sweeping a curve over further curves which intersect said curve. The surface patches are then mixed in order to obtain the complete surface with a free form. Said method has no provisions for streamlining the surface in a manner which is especially suitable for designing ships. Furthermore, changes can be made only in the points of the curves, after which the curves and the entire surface are recalculated.

The abovementioned methods all have the following disadvantages to a greater or lesser extent. Surface models give rise to difficulties with regard to the definition of a single streamlined surface because of the joints to and connections between the various surfaces. Following an initial definition of the surface, a very large number of complex operations on the part of the designer are frequently needed in order to achieve the final optimum result.

Because of the intrinsic lack of cohesion between the topological elements, the non-complete modelling methods are not able to define a streamlined surface unambiguously, as a result of which definition of the surface is difficult and susceptible to topological inconsistencies. Moreover, in the case of the non-complete modelling methods, coupling with methods for other calculations in the design process is often difficult or not possible because insufficient data are available with regard to the three-dimensional surface. Other calculations in the design process to which consideration can be given are methods for CFD (computational fluid dynamics) computing techniques or methods for production of components (computer aided manufacturing, CAM) or rapid production of prototypes (rapid prototyping).

SUMMARY OF THE INVENTION

The aim of the present invention is to provide a method and device for designing a surface with a free form, with which it is possible interactively, effectively and efficiently to modify and to streamline the three-dimensional surface and with which the abovementioned disadvantages are not present.

Said aim is achieved with a method of the type defined in the preamble, wherein in step a) the representation of the topological model also comprises the data structure line, which describes a sequence of edges, so that a non-regular network is formed which encompasses the entire three-dimensional surface with free form.

The method according to the present invention has the advantage that a non-regular network of curves can be used, as a result of which it is possible to generate arbitrary two-dimensional presentations of the three-dimensional surface, such as waterlines, verticals or ribs in a ships' hull design. Furthermore it is possible to add partial network lines to the topological model, as a result of which it is possible to add highly local details without these affecting the remainder of the three-dimensional surface. Furthermore, the present method makes it possible to add or delete lines in all phases of the design.

In one embodiment of the present method the representation of the topological model further comprises the data structure curve, which is linked to the data structure edge and forms the geometrical description thereof. By adding curves as a geometrical description of the edges of the topological model it is possible to add geometrical shapes to the half-edge data structure of the topological model.

In a further embodiment of the present method, the representation of the topological model comprises the data structure plane, which is linked to the data structure facet and forms the geometrical description thereof. Preferably, the plane is linked to the data structure line, the line describing the periphery of the plane, and the plane is also linked to the curves located in the plane. By adding a plane as a geometrical description of a facet in the topological model, the description of the three-dimensional surface is complete. The topological model of the three-dimensional surface with the geometrical descriptions of curves and planes linked thereto form a complete geometrical model.

Preferably, the curves are described as non-uniform parameterised rational basis splines (NURBS). This mathematical description of a curve makes it possible to display arbitrary curved lines, straight lines, circles, parabolae, ellipses and hyperbolae with the aid of a single standardised equation. This is possible both for curves in a flat plane and for arbitrarily curved curves in the three-dimensional space. In this case the curves are also easy to modify by changing the vertices and weights in the NURBS description. Because the description of curves by means of NURBS or basis splines is standard in many design methods, interchangeability is obtained with (parts of) other software packages, such as standard libraries containing NURBS data.

The plane is preferably described by means of N-sided surface patches. This allows flexible geometrical description of the facets which are located between the edges of the topological model, which, for example, can advantageously be used in subsequent operations or in specific presentations to the user. In this context consideration can be given to visualisation and illustration of the final design, including positioning light sources and applying shadow.

According to a preferred embodiment of the present invention, the model of the three-dimensional surface is processed with the aid of Euler operators in which references to the data structures line and/or curve are incorporated and by operators for adding or removing a data structure line and/or curve, as a result of which the model remains valid and consistent. By only making use of Euler operators, the description of the three-dimensional plane will continue to satisfy the Euler-Poincaré equation for a valid and consistently closed three-dimensional surface. This also makes it possible for the user of the design method to make changes to the model without having to worry about the consistency and validity of the model, since this is automatically ensured by the present method.

In a further embodiment of the method according to the present invention, the display to the user in step b) of the method takes place by calculating and displaying lines on the three-dimensional surface on the basis of the surface patches, independently of the network topography. By, as it were, projecting lines onto the three-dimensional surface formed by the surface patches it is possible to display the three-dimensional surface in various ways. Consequently it is possible, for example, to display only the waterlines of a ship's hull or to display a combination of the waterlines and the rib frame.

A significant advantage of the method according to the present invention is the possibility for interactive modification of the three-dimensional surface. By means of the underlying topological model combined with the geometrical description of curves and planes it is possible to display modifications to the user immediately. If the user makes use of multiple displays when designing, said underlying model ensures that the modifications are visible in all displays.

In a further embodiment of the method according to the present invention step c) further comprises streamlining of the three-dimensional surface by modifying characteristics of the curves, preferably on the basis of an adaptive least squares fit. If the curves are defined on the basis of a basis spline, it is possible to add various weights for a specific curve, which makes targeted adjustments of the streamlining possible when streamlining on the basis of an adaptive least squares fit. The targeted adjustments can relate to specific shipbuilding characteristics, such as greater emphasis on the shape of the bow than on the size of the hold.

Using the method for designing a three-dimensional surface with a free form according to the present invention it is possible to work much more efficiently than with methods known to date, because a consistent network model of curves with extensive boundary modelling forms the basis for all calculations which take place. Consequently it is also possible to arrive at a design interactively, in contrast to the steps in earlier methods which frequently are precisely matched to one another and have to be carried out in a precise sequence. The sequence of manipulations such as streamlining, automatic generation and presentation of new lines can be freely chosen by the user.

In a further embodiment the data relating to the three-dimensional surface from the method according to the present invention are used as input for calculating characteristics of the three-dimensional surface. In this context consideration can be given to calculations relating to computational fluid dynamics (CFD) or hydrostatic calculations. By means of these calculations it is possible to determine numerous characteristics of a ship's hull shape, such as the formation of waves by the ship and the inflow of water to the propeller. A precise definition of the three-dimensional surface, which is possible with the method of the present invention, is necessary for reliable CFD calculations.

In a further embodiment of the method according to the present invention the three-dimensional surface can also be used as input for a method for the digital production of the three-dimensional surface. This can be carried out on actual scale (computer aided manufacturing, CAM) or on a smaller scale (referred to as digital production, rapid prototyping), such as milling, where material is removed from an object, or incremental techniques, where material is added to an object. These methods also demand a very good and complete description of the three-dimensional model.

In a second aspect the present invention relates to a device for designing three-dimensional surfaces with a free form, the device being provided with computing means for carrying out the method according to the invention, and with memory means, connected to the computing means, for storing data relating to the three-dimensional surface, display means and input means.

Preferably, the display means are suitable for displaying multiple windows containing two-dimensional projections of the three-dimensional surface. By this means the designer is able mentally to form a three-dimensional image from the various two-dimensional projections and, after inputting modifications in one of the two-dimensional displays, to see the effect on other two-dimensional projections immediately.

A third aspect of the present invention relates to a computer-readable medium that contains a computer program which, after loading on a device provided with computer means, provides the device with the functionality of the method according to the first aspect of the present invention.

BRIEF DESCRIPTION OF THE DRAWINGS

The present invention will now be further explained on the basis of the description of one embodiment of the method according to the present invention, with reference to the appended drawings, in which.

DESCRIPTION OF THE PREFERRED EMBODIMENTS

Figure 1:
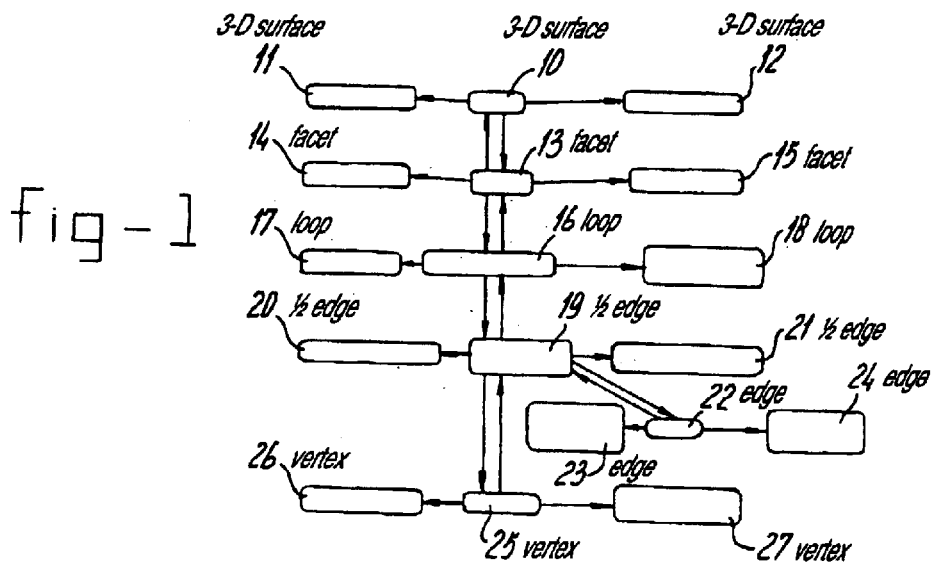
FIG. 1 shows the half-edge data structure.

When displaying three-dimensional surfaces 10 with a free form, usually with the aid of a computer, a breakdown can be made depending on the type of modelling and the mode of representation of elements of the model.

A distinction can be made between complete geometrical models and non-complete geometrical models. Complete geometrical models contain information that is sufficient to answer arbitrary geometrical questions and form unique and unambiguous representations. Non-complete geometrical models do not meet this criterion.

Examples of non-complete models are wire-frames and surface models. A wire-frame is a set of three-dimensional curves (simple wire-frame) and can also contain additional information with regard to connections or topology (extended wire-frame). A wire-frame lacks the information relating to the shape of the three-dimensional plane between the curves which form the wire-frame. A surface model is a set of planes in the three-dimensional space without additional information relating to connections between the planes.

In the case of complete geometrical models a distinction can be made between modelling of topological planes ('manifold') and non-topological planes ('non-manifold'). In the case of topological planes each point on a plane is two-dimensional, that is to say each point has an environment that topologically forms a flat surface. In the case of non-topological planes there are points for which the environment can be topologically equivalent to more than one flat surface. Consequently, keeping the geometrical model consistent and reliable is more complex and requires more computing power than in the case of topological modelling.

Curves and planes in geometrical models can be geometrically represented in various ways. Representations relevant for designing ships' hulls are the parametric representations of curves, to be differentiated into functional representations (conical shapes, clothoids, . . . ) and polynomial representations. These can be representations with the aid of a single polynomial:

$$p(t) = \sum_{i=0}^{n} a_i \cdot t^i$$

where n is the power, a the coefficient vector and t the parameter, or piece-by-piece polynomial representations, such as basis splines:

$$p(t) = \sum_{i=0}^{L+n-1} P_i N_i^n(t)$$

where N is the basis spline basic function, P the three-dimensional vertex and t the parameter, or non-uniform rational basis splines (NURBS):

$$p(t) = \frac{\sum_{i=0}^{K+n-1} w_i P_i N_i^n(t)}{\sum_{i=0}^{K+n-1} w_i N_i^n(t)}$$

where $w_i$ are the additional weight factors.

Geometrical representation of surfaces is, in turn, possible via parametric representations, such as the infinite surface patches (Coons, Gregory and Gordon surfaces and N-sided (N<>4) surface patches), where the shape of the planes is defined by interpolation of curves which surround the plane. As an alternative a plane can be defined by a polynomial representation, given by $$p(t) = \sum_{i=0}^{n} \sum_{j=0}^{n} a_{t,f} . u^j . v^i$$

where n is the power, $a_{i,j}$ the coefficient vector and u and v the parameters. Just as in the case of curves, surfaces can be defined by basis splines and/or NURBS, it being possible to manipulate these directly by means of the three-dimensional vertices (and the corresponding weights in the case of NURBS surfaces) or with the aid of data interpolation.

The method according to the present invention uses a complete geometric model in order to guarantee that the three-dimensional surface is consistent and can be determined unambiguously during the design process. The present invention makes use of boundary modelling. Boundary models display the three-dimensional surface 10 indirectly by representation of boundary elements (facets 13, edges 22 and vertices 25). Boundary modelling is a special case of modelling by means of topological planes (manifold modelling).

For representation of the model with boundary modelling use is made of the half-edge data structure as shown in FIG. 1. The half-edge data structure consists of a group of pointers which belong to one edge half 19, the pointers each pointing to neighbouring topological elements. On the basis of these the three-dimensional surface 10 is modelled as lists of elementary topological elements which all point to neighbouring elements in the structure. FIG. 1 shows the elements of the half-edge data structure:

three-dimensional surfaces 10–12;
facets 13–15; a polygon (a facet can point to one or more closed loops 16 which form the boundary of the facet 13; if the facet 13 points to several closed loops 16, one of these forms the outer boundary and the others inner boundaries);
closed loops 16–18: a boundary of a facet 13;
edges 22–24: an element of the closed loop 16;
half-edges 19–21: half of an edge 22;
vertices 25–27: comprises a vector with actual coordinates in the three-dimensional space.

Each element in the half-edge data structure can refer to a previous and a subsequent element of the same type and to one or more elements of a higher or lower type. By this means a multidimensional set of relationships between the elements is produced. In FIG. 1, for example, a half-edge 19 can refer to a previous half-edge 20, a subsequent half-edge 21, an edge 22, a vertex 25 and/or a closed loop 16.

Figure 2:
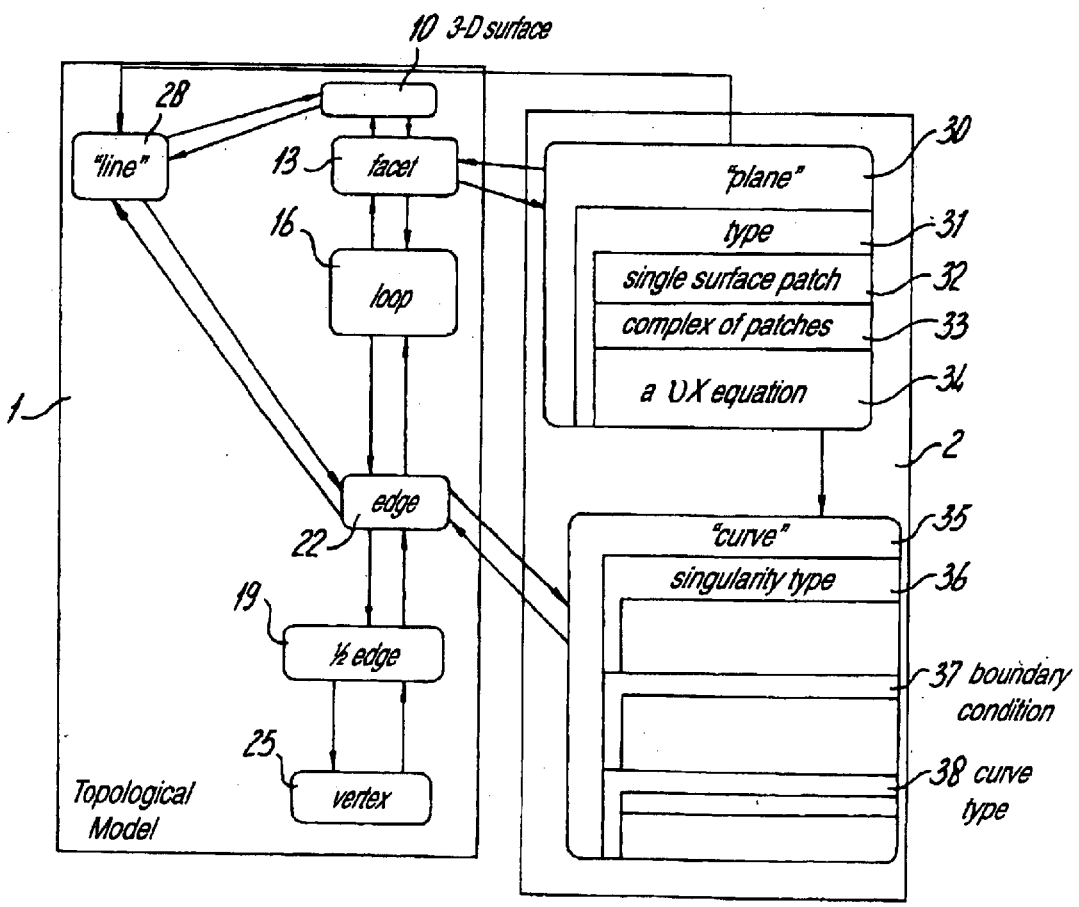
FIG. 2 shows the diagrammatic data structure used in the present method.

FIG. 2 shows the data structure of the extended boundary modelling according to the present invention. Corresponding elements are shown with the same reference numerals in FIG. 1 and FIG. 2.

Two important elements for designing ships' hulls are lacking in the boundary modelling used to date and discussed above:

continuous curves and lines; with boundary modelling edges 22 are given only around the facets 13 and not systematically around the entire hull surface or three-dimensional surface 10;
geometry; the edges 22 and facets 13 have no geometrical representation in boundary modelling; they are not curved.

To this end, as is shown in FIG. 2, with the method according to the present invention the topological model 1 of the boundary model is expanded by an additional data structure, which is termed a line 28 and is made up of a sequence of one or more edges 22. A line 28 could also be termed an open loop, in contrast to the closed loop 16.

Furthermore, a number of geometrical descriptions 2 are added to the topological model 1, as shown in FIG. 2. On the one hand, the data structure curve 35, which can be coupled to an edge 22, is introduced. A plane 30 also refers to all curves 35 which are located in the plane 30 and/or form boundaries of the latter. In addition, a plane 30 that forms the (three-dimensional) geometrical description of a facet 13 is introduced. The boundary line of a plane 30 is incorporated in the data structure as a line 28.

The data structures of the plane 30 and the curve 35 give the geometrical description of the shape of the plane 30 and of curve 35, respectively. A plane 30 is described on the basis of the plane type 31, which, for example, can be a single surface patch 32, a complex of surface patches 33, or an auxiliary equation 34. A curve 35 is described with the aid of the singularity type 36 (the type of (dis)continuity of the curve 35, $G^2$; $G^1$; $G^0$), boundary condition 37 (prescribed contact lines or curves, the relationship with other curves 35 (master/slave relationship)) and curve type 38 (non-uniform rational basis spline (NURBS), geometrical primitive).

Because continuous curves 35 are available it is possible to give a geometrical representation of curves 35 with the aid of standard three-dimensional NURBS curves. By making use of this 'de facto' standard, compatibility with a large number of other software packages is achieved. The shape of the NURBS curves 35 can be modified by the user by manipulation of the vertices (corner points) and the weights of the NURBS curve 35. To shield the user from the mathematical background of NURBS curves, the order of the NURBS curve per type of curve is specified in the present method. Straight line segments are of the second order and further geometrical curve primitives are of the third order; curves 35 with a free form and with no restrictions with regard to the derivative in the end points (or only with specification of the first order derivative in the end point) are of the fourth order; and curves 35 with two restrictions of the second order derivative are of the sixth order. Because the latter are flexible in their behaviour, these are used as little as possible to prevent undesired inflections of the three-dimensional surface 10.

The user of the present method can specify the restrictions with regard to the derivatives for each end point of a curve 35. In addition, a master/slave relationship between two adjoining curves 35 can be defined, the user specifying that the contact line or the curvature of the adjacent curve 35 determines the contact line or curvature of the curve 35 concerned.

In the extended boundary model according to the present invention the plane 30 cannot be displayed with the aid of an NURBS surface, Use is made of the infinite interpolation methods, which are known per se and employed on the extended boundary model (for example Coons, Gregory and Gordon surfaces and N-sided (N<>4) surface patches). The shape of the facets 13 and, therefore, the entire three-dimensional surface 10 is thus derived from the shape of the curves which are located around the facets 13 and in the surface 10. As an alternative it can be elected to define a plane 30 on the basis of an auxiliary equation 34.

The N-sided surface patch method is preferably used to define the planes 30 with the aid of a single patch 32. Coons-Gregory surface patches, as described, for example, in "C1 Rectangular and Non-Rectangular Surface Patches" by J. A. Gregory in Proceedings of Surfaces in Computer Aided Geometric Design, Apr. 25–30 1982, pages 25–34, which are known per se are used for N=4. In the other cases (N<>4), use is preferably made of the Boolean summation method or convex combination of N local surface patches.

Use can also be made of complexes of surface patches, for which the $G^1$ Gordon surface patch, as described in T. W. Jensen et al. "Practical Curves and Surfaces for a Geometric Modeler", Computer Aided Geometric Design 8 (1991), pages 357–369, is preferably used.

As a third alternative a surface patch can be defined with the aid of an auxiliary equation. For this purpose use is preferably made of developable surfaces, defined as a family of planes having one parameter: $x(t,v)=p(t)+vq(t)$, where p is one of the boundary curves to be defined by the user and q has to be determined to fit in the characteristic of the developable surface. Here each contact plane is in contact with the developable surface along a straight line. Because the geometrical representation of a developable surface does not form part of the data structure of the present method, this is calculated from the actual curve geometry when needed.

The consistency and unambiguity of the representation of the three-dimensional surface 10 is guaranteed because the model according to the present method is manipulated with the aid of a limited group of Euler operators. The Euler operators ensure that the model continues to satisfy the Euler-Poincaré equation and thus remains valid and consistent. If V is the number of vertices 25, E the number of edges 22, F the number of facets 13 and S the number of three-dimensional surfaces 10, the Euler-Poincaré equation for each topological valid, closed surface is $V-E+F-2S=0$. If, for example, an edge 22 is added to the model, a vertex 25 or a facet 13 must also be added. For the method according to the present invention the normally customary Euler operators are expanded with references to the additional data structures line 28 and curve 35 and by functions which add or delete elements which are not specified in the Euler-Poincaré equation, such as line 28 and curve 35. Furthermore, a high-level function is also added which intersects the surface 10 by an infinite plane and adds the curves 35 generated by this means to the hybrid model, for example to define waterlines of a ship's model.

By limiting processing of the pointers in the data structure to within said Euler operators, these can form an abstraction layer and shield the application at higher level. As a result it is possible to allow a user to use design functions without the user having to worry about the validity and consistency of the model.

Figure 3:
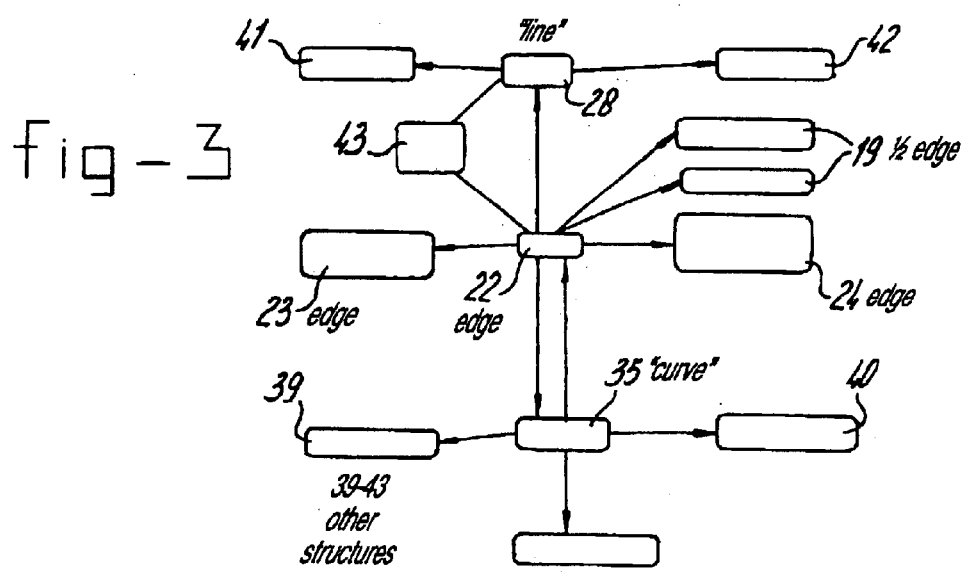
FIG. 3 shows the line-edge-curve structure used in a preferred embodiment of the present method.
Figure 4:
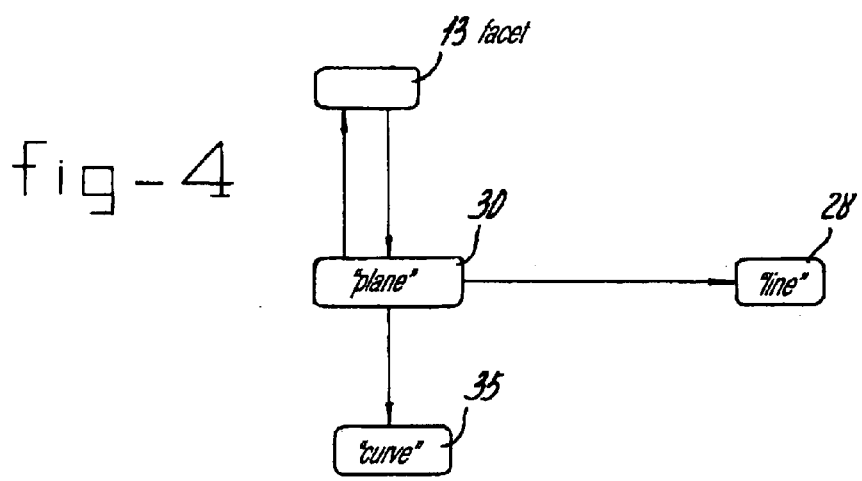
FIG. 4 shows the facet-plane curve structure used in a preferred embodiment of the present method.

In the structure in FIG. 2 three main directions are to be indicated. The first is the half-edge structure (surface—facet—loop—half-edge—vertex) which has been discussed above and is shown in FIG. 1. In addition, the main direction line 28 —edge 22—curve 35 shown in FIG. 3 is present in the structure. In these two main directions al data elements are embedded in supporting side structures (e.g., edges 23–24 and other structures 39–43), so that linear lists of all elements can be kept up to date. The elements of the first two main directions can be kept up to date by means of the abovementioned expanded Euler operators. The third main direction is the structure comprising facet 13—plane 30—curve 35, as shown in FIG. 4. The plane 30 refers to the lines 28 which form a periphery of the plane 30 and to curves 35 which are located in the plane 30 or form the boundary thereof.

As described above, a plane 30 can be displayed with the aid of a single infinite surface patch 32, a complex of infinite surface patches 33 or an auxiliary equation 34. The infinite surface patch 32 and the complex of infinite surface patches 33 can be generated automatically, but for a plane defined by an auxiliary equation 34 the user him- or herself has to indicate the boundaries for the region where the equation is valid. In the method according to the present invention, the boundaries of said planes 34 defined by an auxiliary equation are specified by lines 28. The method comprises further functions for assessing the validity of the planes 30 defined in this way.

The method according to the present invention also relates to a number of functions for modifying the topological model 1 and the geometrical display 2 during the design process.

When designing ships' hulls the shape of the hull is important for streamlining but also for an attractive appearance. Consideration is given to both aspects during the design stage by means of a function which is referred to as fairing. In the present method fairing can be carried out on the curves 35, both at local and at global level, a fairing criterion being used which has a geometrical significance. Because the curves 35 are distributed over the entire surface 10 it is possible to fair the shape of the surface 10. The Dierckx algorithm (see P. Dierckx, "Curve and Surface Fitting with Splines", Oxford University Press, Oxford, UK, 1993) can be used both globally and locally in combination with criteria having a geometrical significance. Consequently this algorithm is preferably used in the present method. In this case the fairing criterion is the total deviation between original and faired data points. Interpolation can be regarded as a special case of the fairing function where the tolerance is zero.

In the present method the user can use functions for transforming the hull shape and for generating the distribution of sectional areas of the ship's hull model (sectional area curve, SAC). Preferably, these two functions are combined. An initial SAC is used as the starting point and this is transformed by operators of the Lackenby type. It is possible to perform transformations of the SAC or the entire hull model either manually or automatically. Using these functions, only coordinates of the vertices and the NURBS curve vertices are modified, whilst the topology remains unchanged. The SACs are frequently used as input for hydrostatic calculations.

In addition the present method preferably comprises the option of line projection for projecting butts and the long sides of skin or deck plates on the hull shape (the three-dimensional surface 10) and functions for generating output. The output can be to plotters, which plot the design on paper, or in the form of data in a specific data structure (for example DXF, IGES . . . ). The structure of the model 1, 2 on which the present method is based is adequate for implementation of these functions.

Furthermore, the user must be able to manipulate the model and the elements thereof in order to arrive at the final desired three-dimensional surface 10 and must also be able to insert elements of the model.

Especially when designing ships' models, use is preferably made of large scale models for visualising the design or for trials in water basins. The method according to the present invention is therefore preferably to be integrated with a method for digital production of the three-dimensional surface 10 in actual size ('computer aided manufacturing') or on a smaller scale, for example with the aid of milling or thick layer object modelling (TLOM). The production or modelling technique used and/or physical limitations can make it necessary for the model to be segmented, after which the segments can be assembled after production or modelling.

Figure 5:
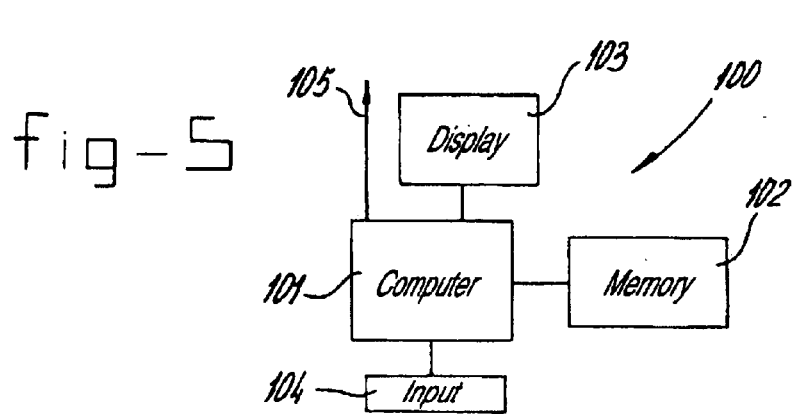
FIG. 5 shows a block diagram of a device which is equipped to perform the method of the present invention.

FIG. 5 shows a diagrammatic representation of a device 100 that is equipped for carrying out the method according to the present invention. To this end the device is provided with computing means 101 and memory means 102, connected to the computing means, for storing data relating to the three-dimensional surface 10, display means 103 and input means 104. The display means 103 and computing means 101 are preferably equipped to be able to display multiple windows containing two-dimensional projections and/or sections of the three-dimensional surface. According to further embodiments the computing means 101 can be equipped to make output of data possible via output 105, for example for outputting line plans to a plotter or outputting data to a device for the production of scale models.

What is claimed is:

1. A method for designing a three-dimensional surface with a free form, comprising the following steps:
   a) defining an initial surface by forming a topological model of the three-dimensional surface, the topological model being represented by means of half-edge boundary modelling of boundary elements, comprising the data structures facet, closed loop, edge, half-edge and vertex;
   b) presenting the three-dimensional surface to the user with the aid of at least one two-dimensional image; and
   c) modifying the three-dimensional surface, wherein the representation of the topological model also comprises,
      a data structure line (28), which is stored and manipulated as a single entity and describes a sequence of edges (22), so that a non-regular network is formed which encompasses the entire three-dimensional surface (10) with a free form,
      a data structure plane (30), which is linked to the data structure facet (13) and forms the geometrical description thereof, wherein the plane (30) is linked to the data structure line (28), the line (28) describing the periphery of the plane (30), and
      a data structure curve (35), which is linked to the data structure edge (22) and forms the geometrical description thereof, wherein the plane (30) is linked to the curves (35) located in the plane (30).

2. Method according to claim 1, characterised in that the curves (35) are non-uniform parameterised rational basis splines (NURBS).

3. Method according to claim 1, characterised in that a plane (30) is described by means of N-sided surface patches (32).

4. Method according to claim 1, characterised in that the model of the three-dimensional surface (10) is processed with the aid of Euler operators in which references to the line (28) and/or curve (35) data structures are incorporated and by operators for adding or removing a data structure line (28) and/or curve (35), as a result of which the model remains valid and consistent.

5. Method according to claim 1, characterised in that in step b) the presentation to the user takes place by calculating and displaying lines (28) on the three-dimensional surface (10) on the basis of the planes (30).

6. Method according to claim 1, characterised in that step c) further comprises local or global fairing of the three-dimensional surface by modifying the curves (35).

7. Method according to claim 1, characterised in that the topological model of three-dimensional surface (10) is used as input for calculating characteristics of the three-dimensional surface (10).

8. Method according to claim 1, characterised in that the topological model of three-dimensional surface (10) is used as input for a method for the digital production of scale models of the three-dimensional surface (10).

9. Device for designing three-dimensional surfaces with a free form, characterised in that the device is provided with computing means (101) for carrying out the method according to claim 1, and with memory means (102), connected to the computing means (101), for storing data relating to the three-dimensional surface (10), display means (103) and input means (104).

10. Device according to claim 9, characterised in that the computing means (101) and display means (103) are equipped for displaying multiple windows containing two-dimensional projections and/or sections of the three-dimensional surface (10).

11. Computer-readable medium, characterised in that said medium comprises a computer program which, after loading on a device provided with computer means, provides the device with the functionality of the method according to claim 1.

* * * * *